US010516985B2

(12) United States Patent
Lee et al.

(10) Patent No.: US 10,516,985 B2
(45) Date of Patent: Dec. 24, 2019

(54) METHOD AND APPARATUS FOR PERFORMING DISCOVERY IN WIRELESS COMMUNICATION SYSTEM

(71) Applicant: LG ELECTRONICS INC., Seoul (KR)

(72) Inventors: Byungjoo Lee, Seoul (KR); Giwon Park, Seoul (KR); Dongcheol Kim, Seoul (KR); Youngjun Jo, Seoul (KR); Hyunhee Park, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 15/746,378

(22) PCT Filed: Jul. 21, 2016

(86) PCT No.: PCT/KR2016/007954
§ 371 (c)(1),
(2) Date: Jan. 19, 2018

(87) PCT Pub. No.: WO2017/014579
PCT Pub. Date: Jan. 26, 2017

(65) Prior Publication Data
US 2018/0199182 A1 Jul. 12, 2018

Related U.S. Application Data

(60) Provisional application No. 62/195,290, filed on Jul. 21, 2015, provisional application No. 62/198,099, filed on Jul. 28, 2015.

(51) Int. Cl.
*H04W 8/00* (2009.01)
*H04L 29/08* (2006.01)
(Continued)

(52) U.S. Cl.
CPC .......... *H04W 8/005* (2013.01); *H04L 67/1061* (2013.01); *H04L 67/1068* (2013.01); *H04W 4/08* (2013.01); *H04W 48/16* (2013.01)

(58) Field of Classification Search
CPC ....... H04W 8/005; H04W 4/08; H04W 48/16; H04L 67/1068; H04L 67/1061
See application file for complete search history.

(56) References Cited

U.S. PATENT DOCUMENTS

2013/0065627 A1* 3/2013 Jung ................... H04W 76/15
455/515
2013/0148545 A1 6/2013 Jung et al.
(Continued)

FOREIGN PATENT DOCUMENTS

WO 2014109513 7/2014
WO 2015002385 1/2015
WO 2015069031 5/2015

OTHER PUBLICATIONS

Camps-Mur et al. IEEE Wireless Communications, Jun. 2013 (Year: 2013).*

(Continued)

*Primary Examiner* — Andrew Lai
*Assistant Examiner* — Harry H Kim
(74) *Attorney, Agent, or Firm* — Lee Hong Degerman Kang & Waimey

(57) ABSTRACT

The present specification may provide a method for performing discovery by a seeker terminal in a wireless communication system. In this instance, the method by which a seeker terminal performs discovery may comprise the steps of: transmitting a first frame associated with discovery, by the seeker terminal, to an advertiser terminal; receiving, from the advertiser terminal, a second frame in response to the first frame; and discovering a matching P2P terminal on the basis of the received second frame. The seeker terminal (Continued)

may transmit the first fame by operating in only a search mode, without a listen mode and a scan mode; the advertiser terminal may transmit the second frame by operating in only a listen mode: and the seeker terminal and the advertiser terminal may perform discovery in only a first channel.

13 Claims, 15 Drawing Sheets

(51) Int. Cl.
*H04W 4/08* (2009.01)
*H04W 48/16* (2009.01)

(56) References Cited

U.S. PATENT DOCUMENTS

| | | | |
|---|---|---|---|
| 2013/0148643 A1* | 6/2013 | Abraham | H04W 8/005 |
| | | | 370/338 |
| 2013/0252548 A1 | 9/2013 | Levy et al. | |
| 2016/0037444 A1* | 2/2016 | Jung | H04W 48/16 |
| | | | 370/338 |
| 2016/0278144 A1* | 9/2016 | Lee | H04W 8/005 |

OTHER PUBLICATIONS

PCT International Application No. PCT/KR2016/007954, Written Opinion of the International Searching Authority dated Oct. 26, 2016, 17 pages.

* cited by examiner

1st WFD device (mobile phone)  2nd WFD device (display device)

METHOD AND APPARATUS FOR PERFORMING DISCOVERY IN WIRELESS COMMUNICATION SYSTEM

CROSS-REFERENCE TO RELATED APPLICATIONS

This application is the National Stage filing under 35 U.S.C. 371 of International Application No. PCT/KR2016/007954, filed on Jul. 21, 2016, which claims the benefit of U.S. Provisional Application No. 62/195,290, filed on Jul. 21, 2015 and 62/198,099, filed on Jul. 28, 2015, the contents of which are all hereby incorporated by reference herein in their entirety.

TECHNICAL FIELD

The present specification relates to a wireless communication system, and more particularly, to a method of performing service discovery in a wireless communication system and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable terminal such as a personal digital assistant (PDA), a laptop computer, a portable multimedia player (PMP), etc. based on a radio frequency technology.

A standard for a WLAN (wireless local area network) technology is developing by IEEE (institute of electrical and electronics engineers) 802.11 group. IEEE 802.11a and b use an unlicensed band on 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps by applying OFDM (orthogonal frequency division multiplexing) on 2.4 GHz. IEEE 802.11n provides transmission speed of 300 Mbps by applying MIMO-OFDM (multiple input multiple output-orthogonal frequency division multiplexing). IEEE 802.11n supports a channel bandwidth up to 40 MHz. In this case, transmission speed can be provided as fast as 600 Mbps. IEEE 802.11p corresponds to a standard for supporting WAVE (wireless access in vehicular environments). For instance, 802.11p provides improvement necessary for supporting ITS (intelligent transportation systems). IEEE 802.11ai corresponds to a standard for supporting fast initial link setup of IEEE 802.11 station.

A DLS (direct link setup)-related protocol in wireless LAN environment according to IEEE 802.11e is used on the premise of a QBSS (quality BSS) supporting QoS (quality of service) supported by a BSS (basic service set). In the QBSS, not only a non-AP STA but also an AP corresponds to a QAP (quality AP) supporting QoS. Yet, in current commercialized wireless LAN environment (e.g., wireless LAN environment according to IEEE 802.11a/b/g etc.), although a non-AP STA corresponds to a QSTA (quality STA) supporting QoS, most of APs corresponds to a legacy AP incapable of supporting QoS. Consequently, in the current commercialized wireless LAN environment, there is a limit in that a QSTA is unable to use a DLS service.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name. A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. A data communication method via direct connection between devices is also used in a legacy communication by some users in a manner of being mounted on a device (e.g., a cellular phone, a note PC, etc.) on which a wireless communication technology such as Bluetooth is mounted. Yet, according to the data communication method, transmission speed is slow and transmission distance is limited to within 10 m. In particular, when the data communication method is used for transmitting massive data or is used in environment at which many Bluetooth devices exist, there exists a technical limit in performance capable of being felt by a user.

Meanwhile, Wi-Fi P2P maintains most of functions of the legacy Wi-Fi standard and includes an additional part for supporting direct communication between devices. Hence, the Wi-Fi P2P can sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed. Yet, software development supporting the Wi-Fi P2P standard is not vitalized yet. This is because, although a Wi-Fi P2P standard is announced, related software capable of conveniently using the Wi-Fi P2P standard is not distributed.

There exists a device playing a role of an AP in a legacy infrastructure network in a P2P group. The device is called a P2P group owner (GO) in a P2P standard. Various P2P clients may exist on the basis of the P2P GO. One GO exists in a single P2P group only and all remaining devices become client devices.

Recently, the use of Bluetooth, NAN (neighboring awareness networking), and NFC (near field communication) is increasing. Hence, it is necessary to have a method of providing a service in environment in which a plurality of systems or interfaces are provided.

DISCLOSURE OF THE INVENTION

Technical Task

The present specification relates to a discovery method and apparatus in a wireless communication system and apparatus therefor.

One technical task of the present specification is to provide a method for a P2P (peer-to-peer) user equipment to perform discovery in a wireless communication system.

Another technical task of the present specification is to provide a method for performing discovery based on a role of a P2P user equipment in a wireless communication system.

Further technical task of the present specification is to provide a method and apparatus for reducing an unnecessary procedure in case of performing discovery by a P2P user equipment in a wireless communication system.

Technical Solutions

In one technical aspect of the present specification, provided herein is a method of performing discovery by a seeker user equipment in a wireless communication system, including transmitting a first frame for the discovery to an advertiser user equipment, receiving a second frame in response to the first frame from the advertiser user equipment, and discovering a matched P2P (peer-to-peer) user equipment based on the received second frame, wherein the seeker user equipment transmits the first frame by operating in search mode only without a listen mode and a scan mode, wherein the advertiser user equipment transmits the second frame by operating in the listen mode only, and wherein the seeker user equipment and the advertiser user equipment perform the discovery on a first channel only.

In another technical aspect of the present specification, provided herein is a seeker user equipment in performing discovery in a wireless communication system, including a receiving module receiving information from an external device, a transmitting module transmitting information to the external device, and a processor configured to control the receiving module and the transmitting module, wherein the processor is further configured to send a first frame for the discovery to an advertiser user equipment using the transmitting module, receive a second frame in response to the first frame from the advertiser user equipment using the transmitting module, and discover a matched P2P (peer-to-peer) user equipment based on the received second frame, wherein the seeker user equipment sends the first frame by operating in search mode only without a listen mode and a scan mode, wherein the advertiser user equipment sends the second frame by operating in the listen mode only, and wherein the seeker user equipment and the advertiser user equipment perform the discovery on a first channel only.

The following matters are applicable in common to a method and apparatus for performing discovery using a seeker user equipment in a wireless communication system.

According to one embodiment of the present specification, the first channel may include a single social channel.

According to one embodiment of the present specification, the social channel may be set to Channel 6 among Channel 1, Channel 6 and Channel 11.

According to one embodiment of the present specification, if the seeker user equipment fails to discover the matched P2P user equipment on the single social channel, the seeker user equipment may scan a plurality of channels by operating in the scan mode and discover the matched P2P user equipment through a plurality of the channels.

According to one embodiment of the present specification, each of the seeker user equipment and the advertiser user equipment may include the P2P user equipment operating based on an application service platform (ASP) supportive of a plurality of interfaces.

According to one embodiment of the present specification, if the each of the seeker user equipment and the advertiser user equipment does not include the P2P user equipment operating based on an application service platform (ASP) supportive of a plurality of interfaces, the seeker user equipment and the advertiser user equipment may discover the matched P2P user equipment by repeating the scan mode, the listen mode and the search mode alternately.

According to one embodiment of the present specification, the seeker user equipment and the advertiser user equipment may discover the matched P2P user equipment using a plurality of channels.

According to one embodiment of the present specification, the advertiser user equipment may transmit the second frame by operating in the listen mode only if not included in a P2P (peer-to-per) group.

According to one embodiment of the present specification, when the advertisement user equipment is included in a P2P group, if the advertisement user equipment receives the first frame on a second channel, the advertisement user equipment may send the second frame despite not operating in the listen mode. According to one embodiment of the present specification, if the seeker user equipment and the advertiser user equipment operate on 5-GHz band, the seeker user equipment and the advertiser user equipment may discover the matched P2P user equipment through a second channel of the 5-GHz band.

According to one embodiment of the present specification, the second channel of the 5-GHz band may be determined based on a bandwidth of the 5-GHz band.

According to one embodiment of the present specification, the seeker user equipment and the advertiser user equipment may discover the matched P2P user equipment through the second channel of the 5-GHz band only if failing to discover the matched P2P user equipment on the first channel.

According to one embodiment of the present specification, the first frame may include a probe request frame and wherein the second frame may include a probe response frame.

According to one embodiment of the present specification, the method may further include if discovering the matched P2P user equipment based on the received second frame, exchanging information on a service matched with the matched P2P user equipment and establishing a session connection for the matched service with the matched P2P user equipment.

According to one embodiment of the present specification, the information on the matched service may include at least one of a service name, a service ID and ASP related information on the matched service.

Advantageous Effects

The present specification can provide a discovery method and apparatus in a wireless communication system and apparatus therefor.

The present specification can provide a method for a P2P (peer-to-peer) user equipment to perform discovery in a wireless communication system.

The present specification can provide a method for performing discovery based on a role of a P2P user equipment in a wireless communication system.

The present specification may provide a method and apparatus for performing discovery quickly by reducing an unnecessary procedure in case of performing discovery by a P2P user equipment in a wireless communication system.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Figure 1:
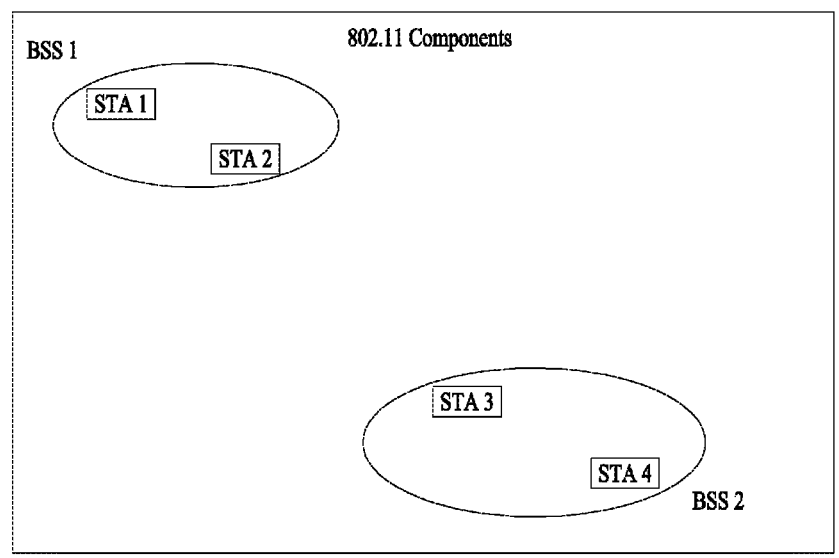
FIG. 1 is a diagram for an example of a structure of IEEE 802.11 system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/

GPRS/EDGE (Global System for Mobile communications)/ General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 shows an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP can be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA can be called a terminal, a wireless transmit/receive unit (WTRU), a user equipment (UE), a mobile station (MS), a mobile terminal, a mobile subscriber station (MSS), and the like.

An oval indicating a BSS in FIG. 1 may be comprehended as a coverage area of the STAs included in the BSS to maintain a communication. This area can be called a basic service area (hereinafter abbreviated BSA). A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA can be associated with the BSS.

Figure 2:
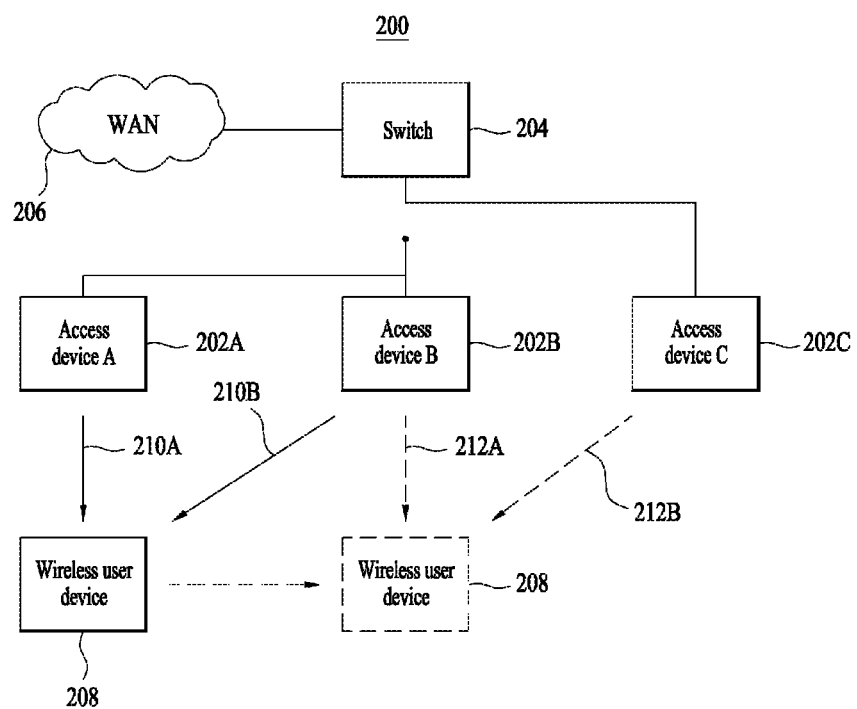
FIG. 2 is a block diagram for an example of operations of a communication system adopting access devices and wireless user devices.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 can receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 can receive beacons from the access devices 202B/202C.

When the wireless device 208 roams in the total WLAN coverage area provided by the system 200, the wireless device 208 can determine which device provides best access to the wireless device 208. For instance, the wireless device 208 repeatedly scans beacons of adjacent access devices and may be able to measure signal strength (e.g., power) related to each of the beacons. Hence, the wireless device 208 can be connected with an access device providing optimal network access based on maximum beacon signal strength. The wireless device 208 may be able to use a different reference related to optimal access. For instance, the optimal access may be associated with more preferable services (e.g., contents, data rate and the like).

Figure 3:
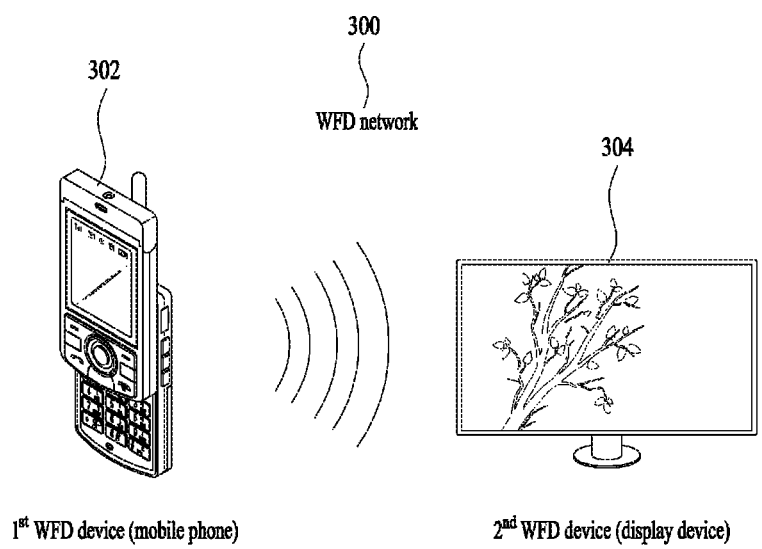
FIG. 3 is a diagram for an example of a WFD (Wi-Fi Direct) network.

FIG. 3 is a diagram for an example of a WFD (Wi-Fi Direct) network.

A WFD network corresponds to a network capable of performing D2D (device-to-device) (or peer to peer (P2P)) communication although Wi-Fi devices do not participate in a home network, an office network or a hot-spot network. The WFD network is proposed by Wi-Fi alliance. In the following, WFD-based communication is called WFD D2D communication (simply, D2D communication) or WFD P2P communication (simply, P2P communication). And, a device performing the WFD P2P communication is called a WFD P2P device, simply, a P2P device.

Referring to FIG. 3, a WFD network 300 can include at least one or more Wi-Fi devices including a first WFD device 302 and a second WFD device 304. A WFD device includes devices supporting Wi-Fi such as a display device, a printer, a digital camera, a projector, a smartphone and the like. And, the WFD device includes a non-AP STA and an AP STA. Referring to an example shown in the drawing, the first WFD device 302 corresponds to a smartphone and the second WFD device 304 corresponds to a display device. WFD devices in the WFD network can be directly connected with each other. Specifically, P2P communication may correspond to a case that a signal transmission path between two WFD devices is directly configured between the WFD devices without passing through a third device (e.g., an AP) or a legacy network (e.g., access WLAN via an AP). In this case, the signal transmission path directly configured between the two WFD devices may be restricted to a data transmission path. For instance, P2P communication may correspond to a case that a plurality of non-STAs transmit data (e.g., audio/image/text message information etc.) without passing through an AP. A signal transmission path for control information (e.g., resource allocation information for P2P configuration, wireless device identification information and the like) can be directly configured between WFD devices (e.g., between a non-AP STA and a non-AP STA, between a non-AP STA and an AP), between two WFD devices (e.g., between a non-AP STA and a non-AP STA) via an AP or between an AP and a corresponding WFD device (e.g., an AP and a non-AP STA #1, between an AP and a non-AP STA #2).

Figure 4:
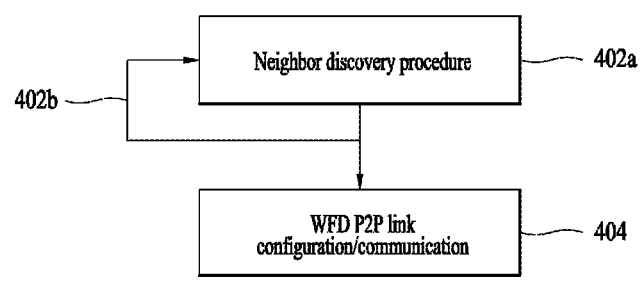
FIG. 4 is a flowchart for an example of a process of configuring a WFD network.

FIG. 4 is a flowchart for an example of a procedure of configuring a WFD network.

Referring to FIG. 4, a procedure of configuring a WFD network can be mainly divided into two procedures. A first procedure corresponds to a neighbor (device) discovery (ND) procedure [S402a] and a second procedure corresponds to a P2P link configuration and communication procedure [S404]. A WFD device (e.g., 302 in FIG. 3) finds out a different neighboring device (e.g., 304 in FIG. 3) in coverage (of the WFD device) via the neighbor discovery procedure and may be able to obtain information necessary for associating with the neighboring WFD device, e.g., information necessary for pre-association. In this case, the pre-association may indicate second layer pre-association in a wireless protocol. The information necessary for the pre-association can include identification information on the neighboring WFD device for example. The neighbor discovery procedure can be performed according to an available radio channel [S402b]. Subsequently, the WFD device 302 can perform a WFD P2P link configuration/communication procedure with the different WFD device 304. For instance, the WFD device 302 can determine whether the WFD device 304 corresponds to a WFD device not satisfying a service requirement of a user after the WFD device 302 is connected with the neighboring WFD device 304. To this end, the WFD device 302 is second layer pre-associated with the neighboring WFD device 304 and may be then able to search for the WFD device 304. If the WFD device 304 does not satisfy the service requirement of the user, the WFD device 302 disconnects the second layer connection established with the WFD device 304 and may be able to establish the second layer connection with a different WFD device. On the contrary, if the WFD device 304 satisfies the service requirement of the user, the two WFD devices 302/304 can transceive a signal with each other via a P2P link.

Figure 5:
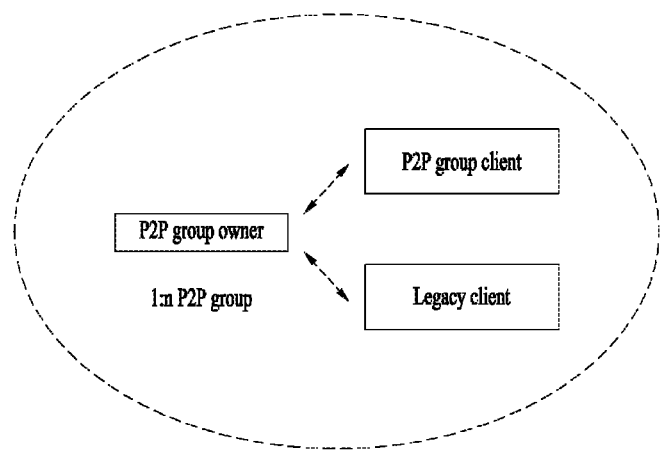
FIG. 5 is a diagram for a typical P2P network topology.

FIG. 5 is a diagram for a typical P2P network topology.

As shown in FIG. 5, a P2P GO can be directly connected with a client including a P2P function. Or, the P2P GO can be connected with a legacy client, which has no P2P function.

Figure 6:
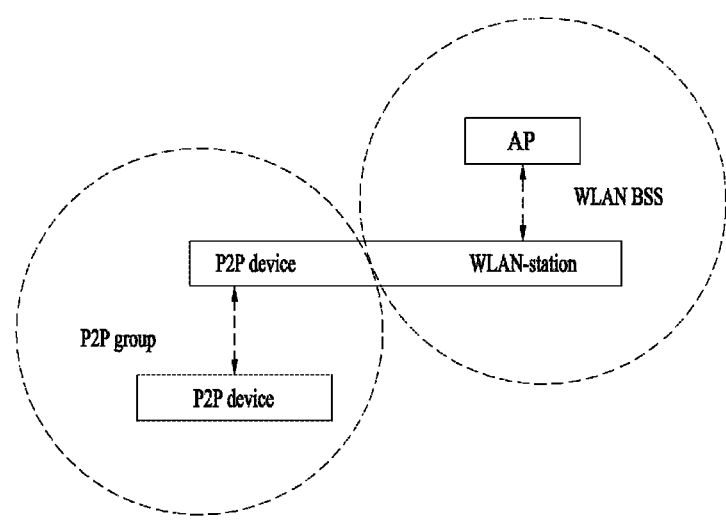
FIG. 6 is a diagram for a situation that a single P2P device forms a P2P group and is connected with an AP in a manner of operating as an STA of WLAN at the same time.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device can belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n can be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group can be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal can be transmitted by the P2P GO only. A P2P device can quickly check the P2P GO using the beacon signal in a scan phase corresponding to a connection initial phase and performs a role of participating in the group. Or, the P2P GO can initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer can select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client can also inform the P2P GO of connection release. In this case, if possible, it is necessary to perform a disassociation procedure. Having received a connection release request of a client, the P2P GO can identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
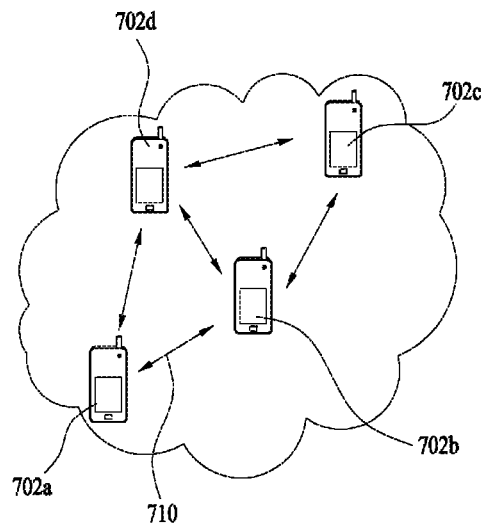
FIG. 7 is a diagram for a WFD network aspect in case that P2P is applied.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself can be newly generated or disappeared dynamically/in a short time. Hence, characteristic of the new P2P application part is in that P2P communication can be performed and terminated dynamically/in a short time between a plurality of the P2P devices in dense network environment.

Figure 8:
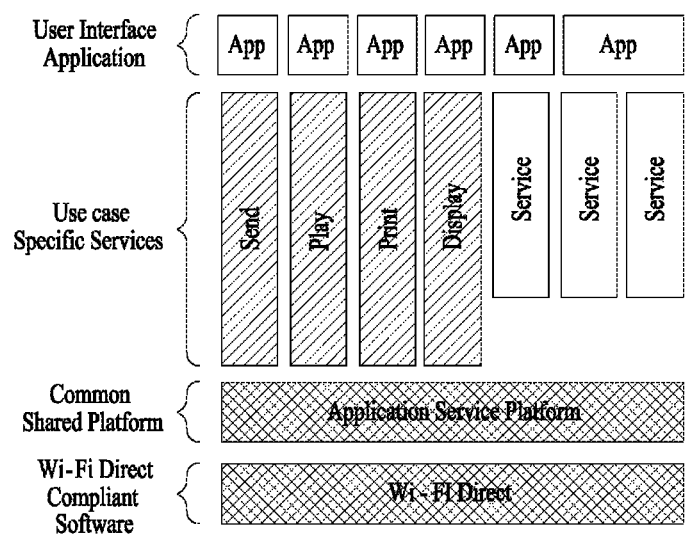
FIG. 8 is a simplified block diagram for a WFDS (Wi-Fi Direct services) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including contents such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name. In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash can be included in a message as information.

Method of Configuring Legacy WFDS

Figure 9:
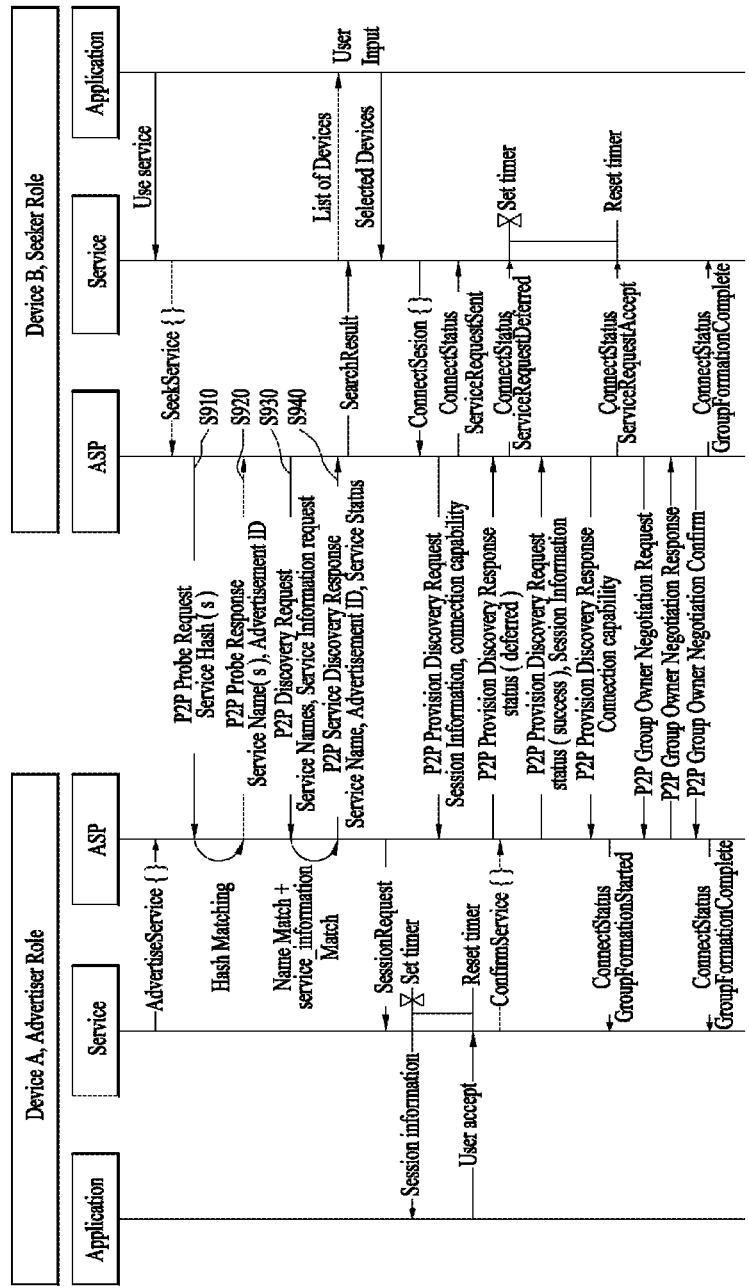
FIG. 9 is a flowchart for a process of establishing a WFDS session by discovering a device and a service between WFDS devices in a legacy WFDS.

FIG. 9 is a flowchart for a process of establishing a WFDS session by discovering a device and a service between WFDS devices in a legacy WFDS.

For clarity, as shown in FIG. 4, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B can also advertise a WFDS capable of being provided by the service end to an ASP end of the device B. In order for the device B to use a WI-DS as a seeker, an application end of the device B indicates a service to be used to the service end and the service end indicates the ASP end to find out a target device to use the WI-DS.

In order to find out the target device to use the WI-DS, the ASP end of the device B transmits a P2P (peer to peer) probe request message [S910]. In this case, the P2P probe request message includes a service name, which is intended to be found out by the ASP end of the device B or is capable of being supported by the ASP end of the device B, in a service hash form in a manner of hashing the service name. Having received the P2P probe request message from the seeker, if the device A supports the corresponding service, the device A transmits a P2P probe response message to the device B in response to the P2P probe request message [S920]. The P2P probe response message includes a service supported by a service name or a hash value and a corresponding advertise ID value. This procedure corresponds to a device discovery procedure indicating that the device A and the device B are WFDS devices. It is able to know whether a service is supported via the device discovery procedure.

Subsequently, it is able to know a specific service in detail via a P2P service discovery procedure, optionally. The device B, which has found a device capable of performing a WFDS with the device B, transmits a P2P service discovery request message to the device [S930]. Having received the P2P service discovery request message from the device B, the ASP end of the device A transmits a P2P service discovery response message to the device B in a manner of matching the service advertised by the service end of the device A with a P2P service name and a P2P service information received from the device B with each other [S940]. In this case, a GAS protocol defined by IEEE 802.11u is used. As mentioned in the foregoing description, when a request for a service search is completed, the device B can inform an application and a user of a search result. At this point, a group of Wi-Fi Direct is not formed yet. If a user selects a service and the selected service performs a connect session, P2P group formation is performed.

In the following, a method of configuring an ASP operating based on at least one selected from the group consisting of WFA, WFDS, Wi-Fi Direct, NAN (Neighbor Awareness Networking), NFC (Near Field Communication), and BLE (Bluetooth Low Energy) is disclosed as an embodiment of the present invention. In this case, the WFDS and the like may correspond to an interface. In particular, the interface may correspond to a method of supporting an operation of a terminal. In the following, a method for an ASP to interwork with a device/service discovery based on the interfaces is explained in detail.

In this case, for example, among the aforementioned interfaces, the BLE may correspond to a Bluetooth transmission/reception scheme in a form of using a frequency of 2.4 GHz and reducing power consumption. In particular, in order to quickly transmit and receive data of extremely small capacity, it may use the BLE to transmit data while reducing power consumption.

And, for example, the NAN (neighbor awareness networking) network may correspond to NAN terminals using a set of the same NAN parameters (e.g., a time period between continuous discovery windows, a period of a discovery window, a beacon interval, a NAN channel, etc.). The NAN terminals can configure a NAN cluster. In this case, the NAN cluster uses a set of the same NAN parameters and may correspond to a set of NAN terminals synchronized with the same window schedule. A NAN terminal belonging to the NAN cluster can directly transmit a multicast/unicast NAN service discovery frame to a different NAN terminal within a range of a discovery window.

And, for example, the NFC may operate on a relatively low frequency band such as 13.56 MHz. In this case, if two P2P devices support the NFC, it may optionally use an NFC channel A seeker P2P device can discover a P2P device using the NFC channel. When an NFC device is discovered, it may indicate that two P2P devices agree on a common channel for forming a group and share provisioning information such as a password of a device.

A method of interworking via an ASP for the aforementioned interfaces is explained in detail in the following. In this case, although the abovementioned configurations are proposed as an interface capable of being interlocked with the ASP, this is an example only. It may support a different interface as well, by which the present invention may be non-limited.

Figure 10:
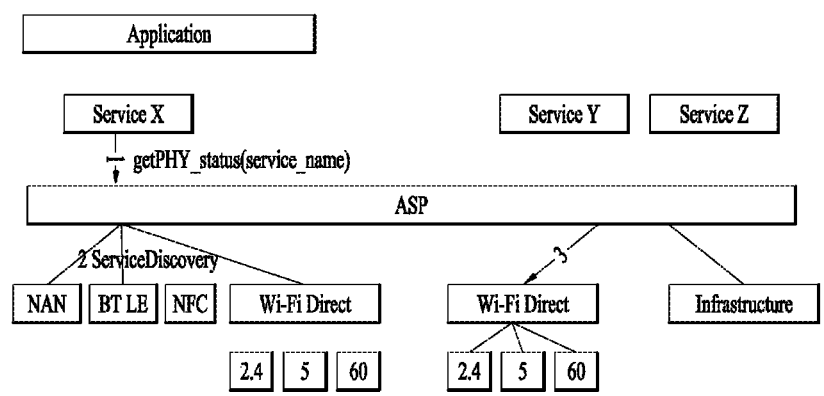
FIG. 10 is a diagram for a service application platform (ASP) supporting a plurality of interfaces.

FIG. 10 is a diagram for a service application platform (ASP) supporting a plurality of interfaces.

As mentioned in the foregoing description, a service end of an advertiser terminal corresponding to a terminal supporting WFDS advertises a service capable of being provided by the service end and a service end of a seeker terminal corresponding to a different terminal supporting the WFDS can indicate an ASP end to search for a target device for which the service is to be used. In particular, it may be able to support the WFDS between terminals via the ASP.

In this case, referring to FIG. 10, the ASP can support a plurality of interfaces. In this case, for example, the ASP can support a plurality of interfaces for performing service discovery. And, the ASP can support a plurality of interfaces for performing service connection.

In this case, for example, a plurality of the interfaces for performing the service discovery may correspond to at least one selected from the group consisting of Wi-Fi Direct, NAN (Neighbor Awareness Networking), NFC (Near Field Communication), BLE (Bluetooth Low Energy), and WLAN Infrastructure.

And, a plurality of the interfaces for performing the service connection may correspond to at least one selected from the group consisting of Wi-Pi Direct, P2P, and Infrastructure. And, for example, the ASP can support a plurality of frequency bands. In this case, for example, a plurality of the frequency bands may correspond to 2.4 GHz, 5 GHz, 60 GHz, and the like. And, for example, the ASP can support information on a frequency band less than 1 GHz. In particular, the ASP can support a plurality of frequency band and is not restricted to a specific frequency band.

Referring to FIG. 10, a first terminal can perform device discovery or service discovery on a first service using the ASP. Subsequently, if searching for the device discovery or the service discovery is completed, it may perform service connection based on a search result. In this case, for example, an interface used for performing the service discovery may be different from an interface used for performing the service connection. The interfaces can be selected from among a plurality of interfaces.

In this case, the ASP may use information or a parameter for supporting a plurality of the interfaces.

Regarding the ASP, for example, a service end of a terminal can obtain information on a service discovery method capable of supporting the first service and a connection method from the ASP. In this case, the first service may correspond to a service provided by the terminal and is not restricted to a specific service.

The service end of the terminal can call AdvertiseService( ) or SeekService( ) method to the ASP based on the information obtained from the ASP. In particular, similar to a legacy ASP operation, the terminal can use the ASP as an advertiser or a seeker to perform service discovery on the first service. After the service discovery is performed on the first service, the terminal can perform service connection based on a result of the service discovery. In this case, the service connection may correspond to a P2P or a WLAN infrastructure. In this case, for example, since both the service connections support a plurality of frequency bands, the service connection can be performed on the basis of a preferred band.

In this case, for one example, information on a service discovery method and connectivity method may be represented as Table 1.

TABLE 1

| Connectivity methods | P2P | Multiband information | 2.4, 5, 60 GHz | |
|---|---|---|---|---|
| | Infrastructure information | BSSID | | |
| | | Multiband information | 2.4, 5, 60 GHz | Channel Index per band |
| Service Discovery methods | | NAN | | |
| | | BTLE | | |
| | | NFC | | |
| | | Infrastructure | | |
| | P2P | Multiband information | 2.4, 5, 60 GHz | |

Figure 11:
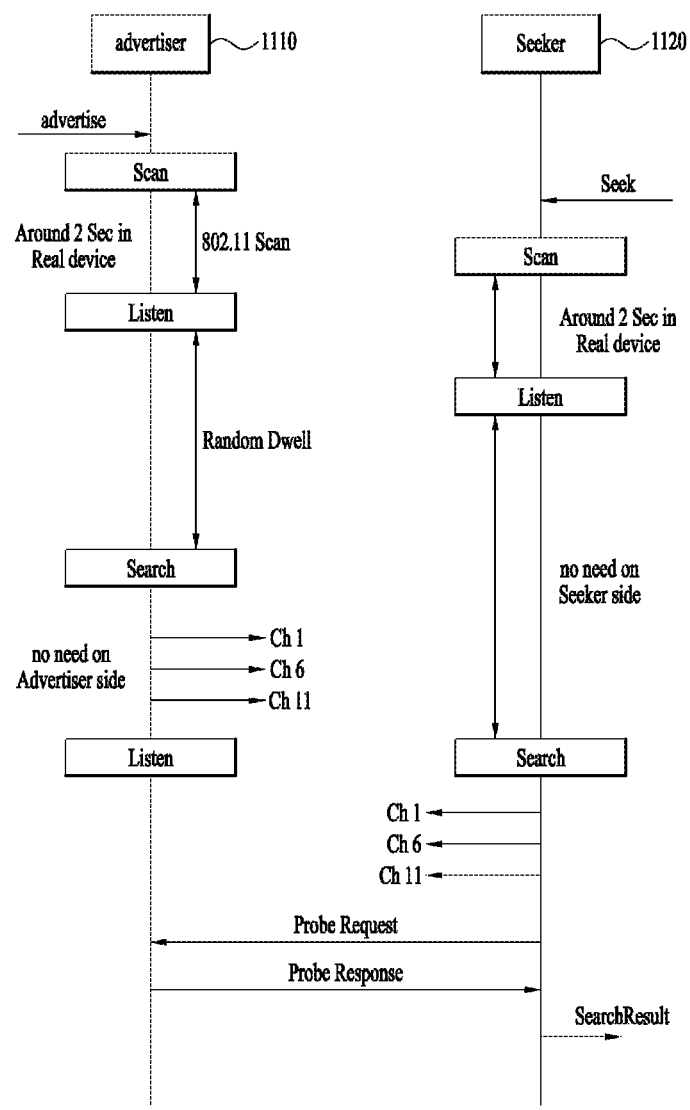
FIG. 11 is a diagram showing a method of performing discovery by an existing P2P UE.

FIG. 11 is a diagram showing a method of performing discovery by an existing P2P UE.

As described above, a service can be provided between an advertiser UE and a seeker UE. In this case, in order to provide a service between an advertiser UE and a seeker UE, a seeker can precedently seek a service of an advertiser. In doing so, a P2P seek method can be used.

Referring to FIG. 11, an existing P2P UE 1110/1120 can operate in listen mode and search mode alternately and repeatedly after a scan phase. Here, the P2P UE 1110/1120 can perform an active seek using a probe request frame for a whole channel in the scan phase. Thereafter, the P2P UE 1110/1120 performs an active seek using a probe request frame in a find phase and is able to perform an active seek using social channels of Channels 1, 6 and 11 (e.g., 2412 MHz, 2437 MHz, and 2462 MHz).

In this case, as described above, for example, a listen mode (or a listen state) and a search mode (or a search state) can be operated alternately and repeatedly as a find phase after a scan phase. In the following description, although such a term as a phase, a mode or a state is written as a mode regarding an operation of a P2P UE, it may mean a phase or state. So, such an operation is non-limited by the term. (For example, a scan mode may mean a scan phase.)

The P2P UE 1110/1120 may maintain a receiving state by selecting a single channel from the aforementioned 3 social channels in the listen mode [S414]. Namely, if the P2P UE 1110/1120 receives a probe request frame, the P2P UE 1110/1120 cab send a probe response frame as a response in the listen mode. In doing so, for example, a listen mode time may be given randomly (e.g., 100, 200, or 300 TU (time unit), Random Dwell).

In particular, the P2P UEs 1110 and 1120 may arrive at a common channel in the course of alternating between a seek node and a receiving mode. Namely, with respect to the P2P UEs 1110 and 1120, while the advertiser UE 1110 maintains the listen mode and the seeker UE 120 maintains the search mode, the P2P UEs 1110 and 1120 can arrive at the common channel. In this case, the seeker UE 1120 can send a probe request frame to the advertiser UE 1110 on Channels 1, 6 and 11 by turns. Moreover, the advertiser UE 1110 can send a probe response frame to the seeker UE 1120. In this case, the advertiser UE 1110 and the seeker UE 1120 can discover a device type, a provided service and the like using the probe request frame and the probe response frame. Namely, as a common operating method of the P2P UEs 1110 and 1120, while the respective modes are alternately repeated, a discovery can be performed in a specific period.

Yet, in aspect of the advertiser UE 1110 providing a service, a scan mode or a search mode may be unnecessary. The advertiser UE 1110 may receive a probe request frame from the seeker UE 1120, determine whether a matched P2P UE exists, and then send a probe response frame to the seeker UE 1120. Namely, in the advertiser UE 1110, a scan mode or a search mode may be an unnecessary mode and a service discovery can be performed by operating in listen mode only.

Moreover, the seeker UE 1120 may send a probe request frame to the advertiser UE 1110 through a search mode and then check whether a matched P2P UE exists. Namely, in aspect of the advertiser UE 1110, a listen mode may be unnecessary. Moreover, if a single channel is set to transmit a probe request frame, a scan mode may be unnecessary for the seeker UE 1120 as well.

Namely, as the advertiser UE 1110 and the seeker UE 1120 operate in listen mode and search mode, respectively, a discovery can be performed using a single channel only. Hence, the existing P2P UE operating method may cause an unnecessary time delay and an unnecessary power consumption in the course of performing a discovery.

Thereafter, the seeker UE 1120 calls out a search result (SearchResult( )) Event to a service/application stage, thereby providing a discovery result for the matched P2P UE.

Thereafter, the seeker UE 1120 can send a service discovery request message to the advertiser UE 1110. Here, a service name for a service matching, a service information and the like may be contained in the service discovery request message. If the advertiser UE 1110 receives a service discovery request frame, an ASP stage of the advertiser UE 1110 determines a presence or non-presence of a matching to a service using at least one of a service name, a service ID and an ASP related information on the service and is then able to send a service discovery response message to the seeker UE 1120. Thereafter, the seeker UE 1120 can perform a session connection to the service with the advertiser UE based on the service discovery result.

Figure 12:
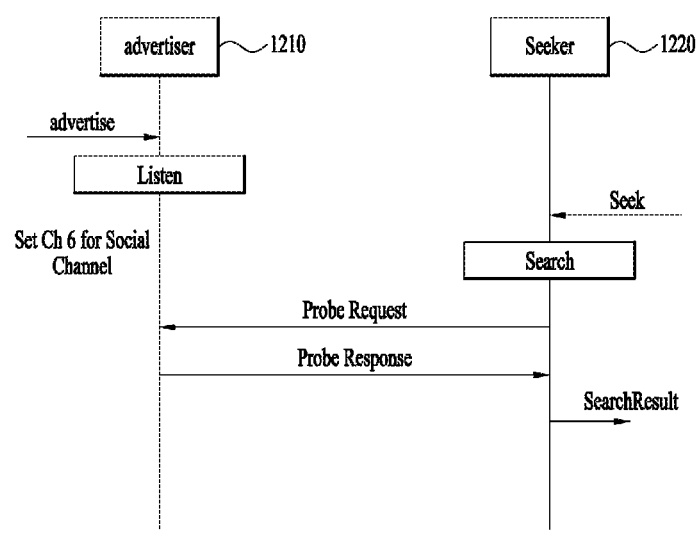
FIG. 12 is a diagram showing a method of performing discovery based on a role of a P2P UE.

FIG. 12 is a diagram showing a method of performing discovery based on a role of a P2P UE.

As described above, in case of performing a discovery, operating modes of a P2P UE may be unnecessary depending on a role of the P2P UE. Therefore, a method of setting an operating mode of a P2P UE according to a role of the P2P UE may be necessary.

Referring to FIG. 12, if an advertiser UE 1210 is triggered as performing 'advertise', the advertiser UE 1210 may operate in listen mode only. In doing so, a used channel may include Channel 6 only among Channels 1, 6 and 11. Namely, only Channel 6 among the common channels can be used as a social channel Through this, a seeker UE 1210 can skip a scan operation of seeking a channel to use among a plurality of channels. Namely, by setting the social channel to Channel 6 only, an unnecessary scan procedure can be reduced.

In this case, if the seeker UE 1220 is triggered as performing 'seek', the seeker UE 1220 can operate in search mode. In doing so, as described above, since the social channel is fixed to Channel 6, the seeker UE 1220 can perform a discovery for a P2P UE through Channel 6.

Particularly, the seeker UE 1220 can send a probe request frame to the advertiser UE 1210 on Channel 6. The advertiser UE 1210 can check whether a matched service exists based on information on a P2P UE and service contained in the probe request frame. Thereafter, the advertiser UE 1210 can send a probe response frame to the seeker UE 1220. Here, device information on the advertiser UE, information on a service and the like may be contained in the probe response frame. In this case, the seeker UE 1220 may check whether a matched P2P UE exists by checking the information contained in the probe response frame. Namely, if the seeker UE 1220 receives the probe response frame, the discovery for the matched P2P UE can be completed. Moreover, if the seeker UE 1220 completes the discovery for the P2P UE, information on the search result may be provided to an upper stage of the seeker UE 1220.

Figure 13:
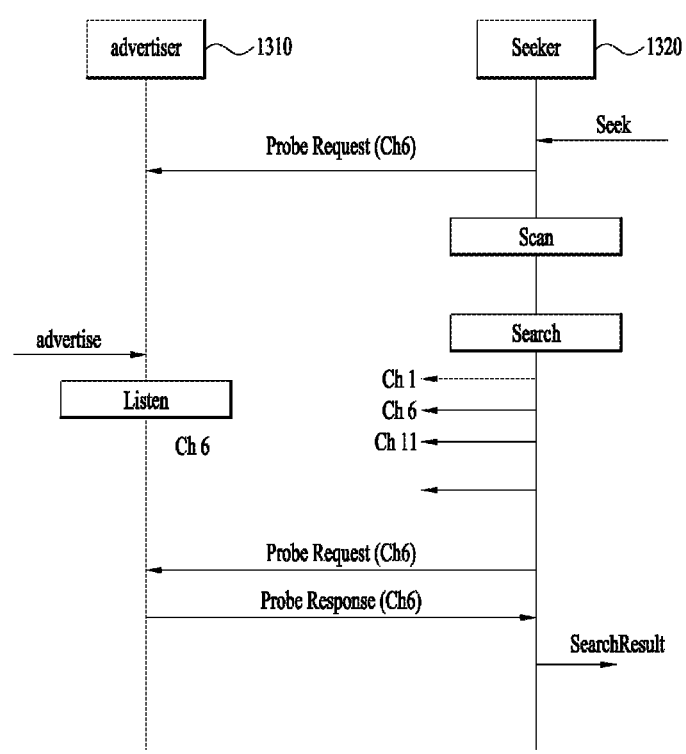
FIG. 13 is a diagram showing a method of performing discovery by a P2P UE in case of failing in discovery on a social channel.

FIG. 13 is a diagram showing a method of performing discovery by a P2P UE in case of failing in discovery on a social channel or discovering a service on a channel other than the social channel additionally.

As described above, a seeker UE 1320 and an advertiser UE 1310 can perform discovery using a single social channel only. In doing so, as described above, an operating mode of the seeker UE 1320 and an operating mode of the advertiser UE 1310 may be set only to a search mode and a listen mode, respectively.

Referring to FIG. 13, the seeker UE 1320 can send a probe request frame to the advertiser UE 1310 on Channel 6 as a single social channel Here, the advertiser UE 1310 may not receive the probe request frame. For example, the reason why the advertiser UE 1310 cannot receive the probe request frame may include various reasons such as a location, a distance, an obstacle and the like, by which the reason is non-limited.

In doing so, the seeker UE 1320 may be aware that it is unable to perform discovery on a single social channel. For example, if the seeker UE 1320 fails to receive a probe response frame from the advertiser UE 1310 within a preset time, the seeker UE 1320 can determine that the discovery is impossible on the single social channel.

In this case, the seeker UE 1320 may operate line the existing P2P UE. Namely, the seeker UE 1320 may operate by repeating a scan mode, a listen mode and a search mode alternately. Here, for example, the seeker UE 1320 may use Channels 1, 6 and 11 as scanned channels. If the advertiser UE 1310 is in a state of using Channel 6, the seeker UE 1320 can send a probe request frame on Channel 6. Then, the seeker UE 1320 can receive a probe response frame through Channel 6. For example, in case that the seeker UE 1320 and the advertiser UE 1310 can use other channels, they can exchange a probe request/response frame on another available channel.

Figure 14:
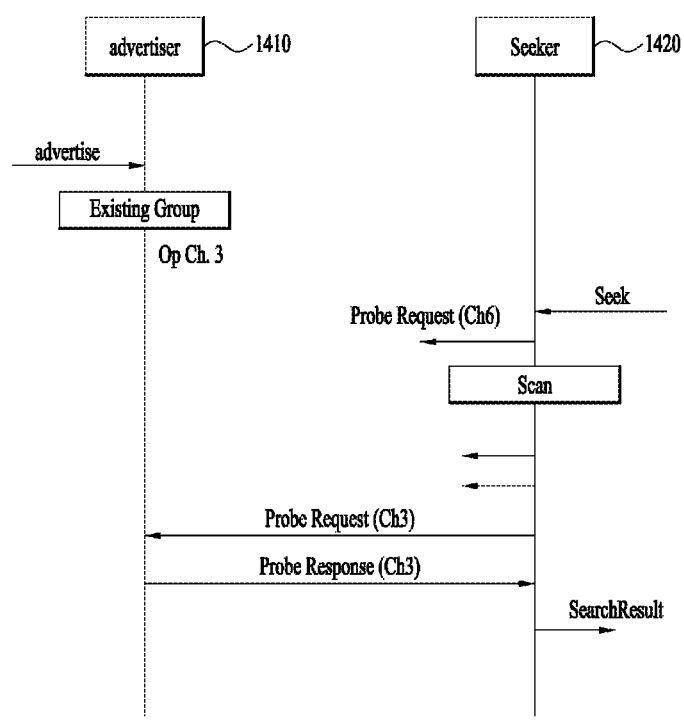
FIG. 14 is a diagram showing a method of performing discovery by a P2P UE in case of failing in discovery on a social channel.

FIG. 14 is a diagram showing a method of performing discovery by a P2P UE in case of failing in discovery on a social channel.

As described above, a seeker UE 1420 and an advertiser UE 1410 can perform discovery using a single social channel only. Here, as described above, an operating mode of the seeker UE 1420 and an operating mode of the advertiser UE 1410 can be only set to a search mode and a listen mode, respectively. In this case, for example, the advertiser UE 1410 may be included in a P2P group. Namely, the advertiser UE 1410 may be included in an existing P2P group. In doing so, for example, the advertiser UE 1410 may not operate in listen mode. Namely, only if the advertiser UE 1410 does not join the P2P group, it can operate in listen mode, which is non-limited by the aforementioned embodiment.

For example, the seeker UE 1420 may send a probe request frame through a single social channel irrespective of whether the advertiser UE 1410 has joined the P2P group. The seeker UE 1420 may not receive a probe response frame from the advertiser UE 1410. The case of not receiving the probe response frame may include the former case described with reference to FIG. 13.

Thereafter, the seeker UE 1420 can scan a plurality of available channels by operating in scan mode. In doing so, the advertiser UE 1410 is included in a preset P2P group and can operate on a different operating channel. The seeker UE 1420 can check an operating channel of the advertiser UE 1410 through the scanning performed in scan mode. The seeker UE 1420 can send a probe request frame through the operating channel of the advertiser UE 1410. And, the seeker UE 1420 may receive a probe response frame from the advertiser UE 1410. Through this, the seeker UE 1420 may complete the discovery for a parched P2P UE. Here, for example, the seeker UE 1420 may join the P2P group including the advertiser UE 1410, which is non-limited by the aforementioned embodiment.

Figure 15:
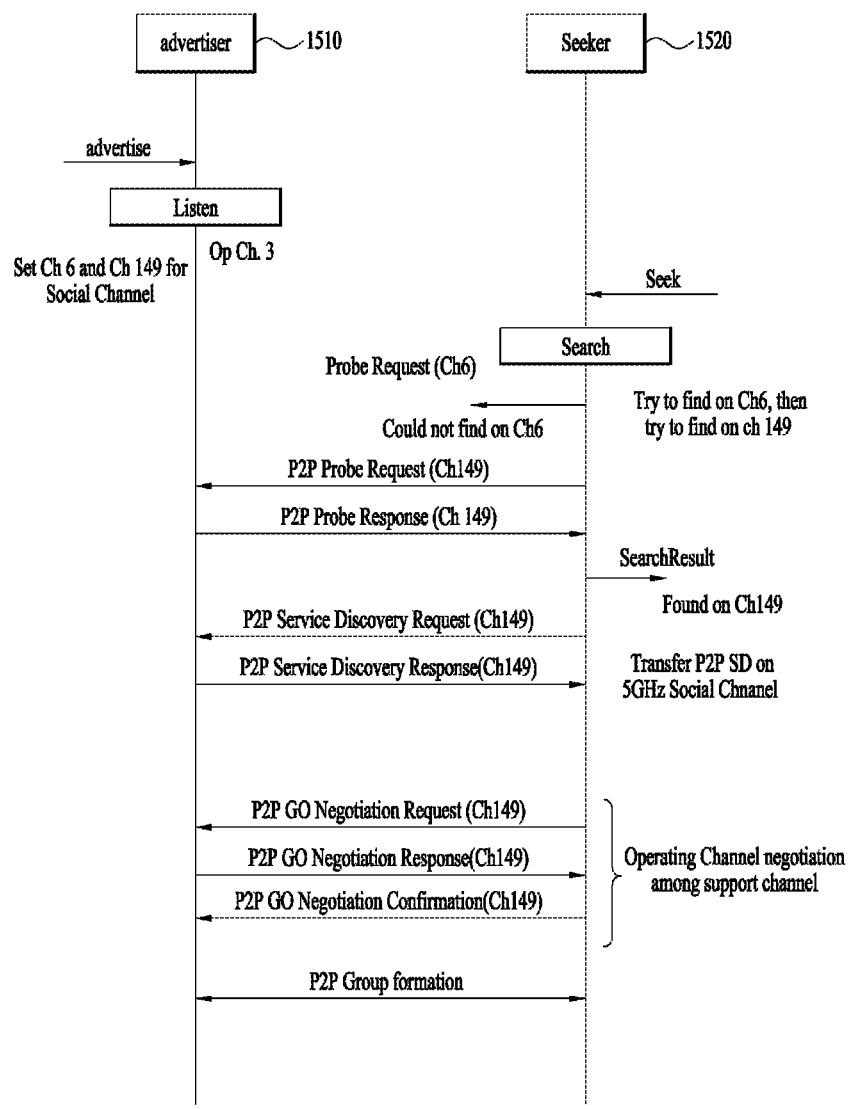
FIG. 15 is a diagram showing a method of performing discovery by a P2P UE operating on 5 GHz band.

FIG. 15 is a diagram showing a method of performing discovery by a P2P UE operating on 5 GHz band.

As described above, a P2P UE can support a plurality of frequency bands. For example, in case that the P2P UE supports 5-GHz frequency band, a channel performing discovery at 5 GHz can be set as a single social channel.

Particularly, if the P2P UE supports 5-GHz frequency band, an advertiser UE 1510 included in the P2P UEs may operate in listen mode and a seeker UE 1520 included in the P2P UEs may operate in search mode. Yet, as the P2P UE can use 5-GHz frequency band, a channel for performing discovery may be necessary as a single social channel for the 5-GHz frequency band.

For example, the single social channel may be configured differently depending on a geographical location or a regulatory domain rule. For example, in case of using a lower band (5.150~5.250 GHz) in the 5-GHz band only, a single social channel may be set to Channel 44 (5.220 GHz).

For example, in case of using an upper band (5.725~5.825 GHz) in the 5-GHz band only, a single social channel may be set to Channel 149 (5.745 GHz).

For example, in case that both of the lower band and the upper band in the 5-GHz band are available, a single social channel may be set to Channel 149 (5.745 GHz). Namely, a single social channel for performing discovery is usable for 5 GHz, which is non-limited by the aforementioned embodiment.

In this case, for example, referring to FIG. 15, the seeker UE 1520 and the advertiser UE 1510 can use a single social channel (hereinafter named a second channel) supported at 5 GHz after Channel 6 (hereinafter named a first channel). Particularly, the seeker UE 1520 can perform discovery using only the first channel as a single social channel in search mode. Namely, the seeker UE 1520 can send a probe request frame to the advertiser UE 1510 on the first channel. In this case, for example, the seeker UE 1520 may not receive a probe response frame on the first channel from the advertiser UE 1510. If so, the seeker UE 1520 may perform discovery using the second channel of 5 GHz. The seeker UE 1520 can send a probe request frame on the second channel to the advertiser UE 1510. Namely, if the seeker UE 1520 performs discovery through the first channel and then fails in the discovery, the seeker UE 1520 can perform discovery through the second channel.

In this case, for example, the seeker UE 1520 may receive a probe response frame through the second channel from the advertiser UE 1510. Through this, the seeker UE 1520 can complete the discovery for the P2P UE. If the seeker UE 1520 discovers a matched UE through the second channel, the seeker UE 1520 can perform a subsequent procedure with the advertiser UE 1510 through the second channel Namely, the seeker UE 1520 can exchange P2P Service Discovery Request/Response Frame, P2P GO (group owner) Negotiation Request/Response Frame, P2P GO Negotiation Confirmation Frame, etc. with the advertiser UE 1510. Namely, if the seeker UE 1520 and the advertiser UE 1510 perform discovery through the second channel, they can progress the subsequent procedure through the second channel.

Moreover, for example, when an advertiser UE is included in a P2P group, if the advertiser UE receives a frame on a second channel, the advertiser UE can send a response frame in response to the received frame despite not being in listen mode.

Figure 16:
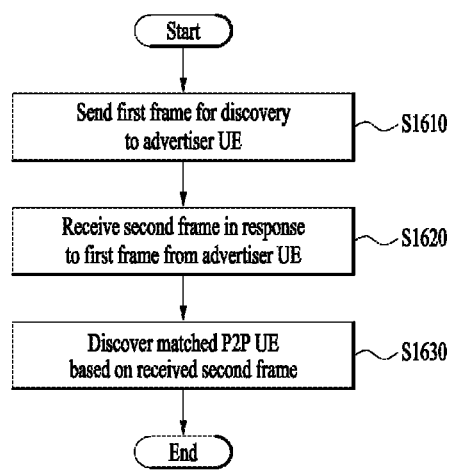
FIG. 16 is a flowchart for a method of performing discovery by a P2P UE according to one embodiment of the present specification.

FIG. 16 is a flowchart for a method of performing discovery by a P2P UE according to one embodiment of the present specification.

A seeker UE can send a first frame for discovery to an advertiser UE [S1610]. In this case, as described in FIGS. 10 to 16, the seeker UE can operate in search mode only among a scan mode, a listen mode and a search mode. And, the advertiser UE can operate in listen mode only among a scan mode, a listen mode and a search mode. Here, the seeker UE can use Channel 6 as a social channel only among Channels 1, 6 and 11. Namely, the seeker UE cap perform discovery through a single social channel. For example, the first frame may include a probe request frame.

Subsequently, the seeker UE may receive a second frame in response to the first frame [S16520]. Here, as described in FIGS. 10 to 16, the second frame may include a probe response frame. In the probe response frame, information on the advertiser UE, matched service information and the like may be contained. Namely, the seeker UE may receive a probe response frame containing information on discovery from the advertiser UE.

The seeker UE may discover a matched P2P UE based on the received second frame [S1630]. As described in FIGS. 10 to 16, the seeker UE may complete the discovery for the advertiser UE by receiving a probe response frame. Here, the seeker UE may provide information on a discovery result to an upper stage.

Figure 17:
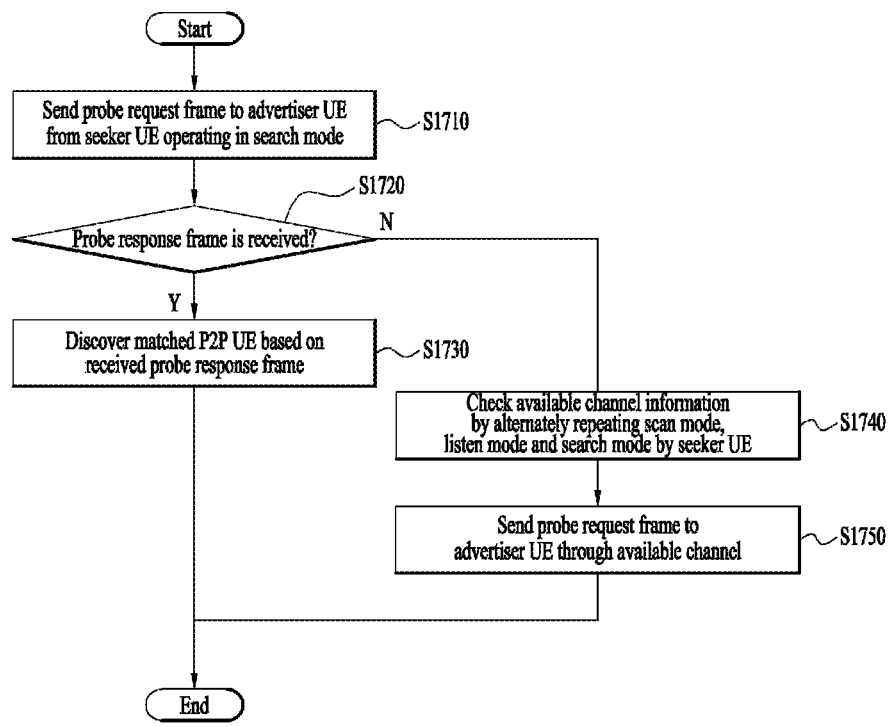
FIG. 17 is a flowchart for a method of performing discovery by a P2P UE according to one embodiment of the present specification.

FIG. 17 is a flowchart for a method of performing discovery by a P2P UE according to one embodiment of the present specification.

A seeker UE may send a probe request frame to an advertiser UE by operating in search ode [S1710]. Here, as described in FIGS. 10 to 16, the seeker UE operates in search ode and sends a probe request frame to the advertiser UE through a single social channel.

Subsequently, if receiving a probe response fame [S1720], the seeker UE may discover a matched P2P UE based on the received probe response frame [S1730]. Here, as described in FIGS. 10 to 16, in the probe response frame, information on the advertiser UE, matched service information and the like may be contained. Namely, the seeker UE may receive a probe response frame containing information on discovery from the advertiser UE and is able to complete the discovery through it.

Subsequently, if failing to receive the probe response frame [S1720], the seeker UE may check available channel information by repeating a scan mode, a listen mode and a search mode alternately [S1740]. And, the seeker UE may send a probe request frame to the advertiser UE through the available channel [51750]. Here, as described in FIGS. 10 to 16, if the seeker UE fails to perform the discovery through a single social channel in search mode, the seeker UE may operate in the same manner of an existing P2P UE. Namely, the seeker UE may operate in a manner of repeating a scan mode, a listen mode and a search mode alternately. Here, the seeker UE may scan a plurality of channels through the scan mode and obtains available channel information. Through an available channel, the seeker UE may send a probe request frame to the advertiser UE. As described above, the seeker UE receives a probe response frame in response and completes the discovery.

Figure 18:
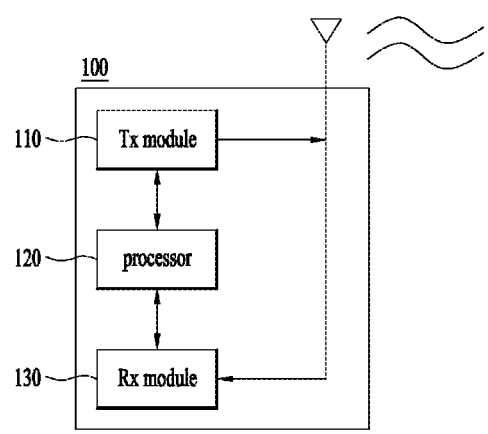
FIG. 18 is a block diagram of a user equipment device e according to an embodiment of the present specification.

FIG. 18 is a block diagram of a user equipment device e according to an embodiment of the present specification.

A user equipment (UE) device may include a P2P UE. For example, the UE device may include a P2P UE supportive of ASP capable of using a plurality of interfaces. The UE device 100 may include a transmitting module 110 transmitting a wireless signal, a receiving module 130 receiving a wireless signal, and a processor 120 controlling the transmitting module 110 and the receiving module 130. The UE 100 may communicate with an external device using the transmitting module 110 and the receiving module 130. Here, the external device may include a different UE device. For example, the external device may include a different UE device connected through P2P or an AP or non-AP device connected through WLAN infrastructure. For example, the external device may include a base station. Namely, the external device may include a device capable of communicating with the UE device 100, which is non-limited by the aforementioned embodiment. The UE device 100 may transmit and receive digital data such as contents and the like using the transmitting module 110 and the receiving module 130.

Moreover, for example, the UE device can play a role as a seeker UE. The UE device can play a role as an advertiser UE, which is described above. Here, according to one embodiment of the present specification, in case that the UE device plays a role as a seeker UE, the processor 120 of the UE device 100 can send a first frame for discovery to an advertiser UE using the transmitting module 110. Here, for example, the first frame may include a probe request frame. The processor 120 receives a second frame in response to the first frame from the advertiser UE using the receiving module 130 and is able to discover a matched P2P UE based on the received second frame. Here, for example, the second frame may include a probe response frame. For example, the seeker UE may send a first frame by operating in search mode only without a listen mode and a scan mode. Namely, the UE device may operate in search mode only in consideration of a seeker UE role. The advertiser UE may send a second frame by operating in listen mode only. Namely, the UE device may operate in listen mode only in consideration of an advertiser UE role. The seeker UE and the advertiser UE may perform discovery on a first channel only. Here, the first channel is a single social channel and the seeker UE and the advertiser UE can perform discovery through the first channel only. Through this, an unnecessary procedure is reduced and a discovery time can be shortened.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein. Those skilled in the art will appreciate that the present invention may be carried out in other specific ways than those set forth herein without departing from the spirit and essential characteristics of the present invention. The above embodiments are therefore to be construed in all aspects as illustrative and not restrictive.

In the present specification, both an apparatus invention and a method invention are described and descriptions of both inventions are applicable supplementarily.

INDUSTRIAL APPLICABILITY

Although a method for a user equipment to perform discovery in a wireless communication system is described centering on an example of applying to a P2P system, such a method is applicable to various wireless communication systems as well as to the P2P system.

What is claimed is:

1. A method of performing a discovery procedure by a seeker UE (user equipment) in a wireless communication system, the method comprising:
   transmitting a first frame for the discovery procedure to an advertiser UE;
   receiving a second frame in response to the first frame from the advertiser UE; and
   discovering a matched P2P (peer-to-peer) UE based on the received second frame,
   wherein the discovery procedure includes a scan mode to seek a channel to use among a plurality of channels, a search mode to send the first frame, and a listen mode to receive the second frame and to respond to the first frame,
   wherein when the seeker UE is triggered to seek a WFDS (Wi-Fi Direct Services), the seeker UE activates the search mode only without the listen mode and the scan mode through the discovery procedure,
   wherein when the advertiser UE is triggered to advertise the WFDS to the seeker UE, the advertiser UE activates the listen mode only without the scan mode and the search mode through the discovery procedure,
   wherein the first frame is transmitted on a predetermined first channel only by the seeker UE operating in the search mode only and the second frame is transmitted on the predetermined first channel only by the advertiser UE operating in the listen mode only, and
   wherein when the seeker UE does not receive the second frame on the predetermined first channel during operation in the search mode only, the seeker UE activates all of the scan mode, the search mode and the listen mode.

2. The method of claim 1, wherein the first channel is set to Channel 6 among Channel 1, Channel 6 and Channel 11.

3. The method of claim 1, wherein each of the seeker UE and the advertiser UE are the P2P UE operating based on an application service platform (ASP) supportive of a plurality of interfaces.

4. The method of claim 3, wherein when the each of the seeker UE and the advertiser UE are not the P2P UE operating based on an application service platform (ASP) supportive of a plurality of interfaces, the seeker UE and the advertiser UE discover the matched P2P UE by repeating the scan mode, the listen mode and the search mode alternately.

5. The method of claim 4, wherein the seeker UE and the advertiser UE discover the matched P2P UE using a plurality of channels.

6. The method of claim 1, wherein the advertiser UE transmits the second frame by operating in the listen mode only when not included in a P2P (peer-to-per) group.

7. The method of claim 1, wherein when the seeker UE and the advertiser UE operate on a 5-GHz band, the seeker UE and the advertiser UE discover the matched P2P UE through a second channel of the 5-GHz band.

8. The method of claim 7, wherein the second channel of the 5-GHz band is determined based on a bandwidth of the 5-GHz band.

9. The method of claim 7, wherein the seeker UE and the advertiser UE discover the matched P2P UE through the second channel of the 5-GHz band only when failing to discover the matched P2P UE on the first channel.

10. The method of claim 1, wherein the first frame comprises a probe request frame and wherein the second frame comprises a probe response frame.

11. The method of claim 1, further comprising:
when discovering the matched P2P UE based on the received second frame, exchanging information on a service matched with the matched P2P UE; and
establishing a session connection for the service matched with the matched P2P UE.

12. The method of claim 11, wherein the information on the service matched comprises at least one of a service name, a service ID and ASP related information on the service matched.

13. A seeker UE (user equipment) for performing a discovery procedure in a wireless communication system, the seeker UE comprising:
a receiving module receiving information from an external device;
a transmitting module transmitting information to the external device; and
a processor configured to control the receiving module and the transmitting module,
wherein the processor is further configured to transmit a first frame for the discovery procedure to an advertiser UE using the transmitting module, receive a second frame in response to the first frame from the advertiser UE using the transmitting module, and discover a matched P2P (peer-to-peer) UE based on the received second frame,
wherein the discovery procedure includes a scan mode to seek a channel to use among a plurality of channels, a search mode to send the first frame, and a listen mode to receive the second frame and to respond to the first frame,
wherein when the seeker UE is triggered to seek a WFDS (Wi-Fi Direct Services), the seeker UE activates the search mode only without the listen mode and the scan mode through the discovery procedure,
wherein when the advertiser UE is triggered to advertise the WFDS to the seeker UE, the advertiser UE activates the listen mode only without the scan mode and the search mode through the discovery procedure,
wherein the first frame is transmitted on a predetermined first channel only by the seeker UE operating in the search mode only and the second frame is transmitted on the predetermined first channel only by the advertiser UE operating in the listen mode only, and
wherein when the seeker UE does not receive the second frame on the predetermined first channel during operation in the search mode only, the seeker UE activates all of the scan mode, the search mode and the listen mode.

* * * * *